(12) United States Patent
Syed et al.

(10) Patent No.: US 9,456,192 B2
(45) Date of Patent: Sep. 27, 2016

(54) METHOD OF CODING AND TRANSMISSION OF PROGRESSIVE VIDEO USING DIFFERENTIAL SIGNAL OVERLAY

(75) Inventors: Yasser Syed, Glendale, CA (US); Mukta Kar, Louisville, CO (US)

(73) Assignee: Cable Television Laboratories, Inc., Louisville, CO (US)

(*) Notice: Subject to any disclaimer, the term of this patent is extended or adjusted under 35 U.S.C. 154(b) by 2782 days.

(21) Appl. No.: 11/956,471

(22) Filed: Dec. 14, 2007

(65) Prior Publication Data

US 2009/0154562 A1 Jun. 18, 2009

(51) Int. Cl.
*H04N 11/24* (2006.01)
*H04N 19/132* (2014.01)
*H04N 19/33* (2014.01)
*H04N 19/587* (2014.01)

(52) U.S. Cl.
CPC .......... *H04N 11/004* (2013.01); *H04N 19/132* (2014.11); *H04N 19/33* (2014.11); *H04N 19/587* (2014.11)

(58) Field of Classification Search
None
See application file for complete search history.

(56) References Cited

U.S. PATENT DOCUMENTS

| | | | | |
|---|---|---|---|---|
| 5,193,004 A * | 3/1993 | Wang et al. | ............. | 375/240.14 |
| 5,270,813 A * | 12/1993 | Puri | ....................... | G06T 3/4007 375/240.01 |
| 5,801,777 A * | 9/1998 | Lyu | ......................... | H04N 7/01 348/446 |
| 6,636,267 B1 * | 10/2003 | Adachi | .......... | H04N 21/440218 348/448 |
| 7,573,529 B1 * | 8/2009 | Perlman | ................. | H04N 7/012 348/448 |
| 2005/0206786 A1 * | 9/2005 | Leaback | ....................... | 348/452 |
| 2006/0023788 A1 * | 2/2006 | Otsuka et al. | ........... | 375/240.16 |
| 2006/0271990 A1 * | 11/2006 | Rodriguez | ..... | H04N 21/234309 725/118 |
| 2007/0053293 A1 * | 3/2007 | McDonald | ......... | H04N 7/17318 370/235 |
| 2007/0206673 A1 * | 9/2007 | Cipolli | .................. | H04L 1/1607 375/240.1 |
| 2007/0296870 A1 * | 12/2007 | Foret | ............................. | 348/701 |

* cited by examiner

*Primary Examiner* — Marsha D Banks Harold
*Assistant Examiner* — Hooman Houshmand
(74) *Attorney, Agent, or Firm* — Great Lakes Intellectaul Property, PLLC.

(57) ABSTRACT

A method of coding and transmission of a 1080p or other higher resolution picture using a lower resolution differential signal overlay on top of a lower resolution existing video signal. The method may be useful for television service providers or other video related application providers in that the use of the lower resolution signals may allow the providers to utilize existing capabilities while providing a higher resolution picture.

24 Claims, 2 Drawing Sheets

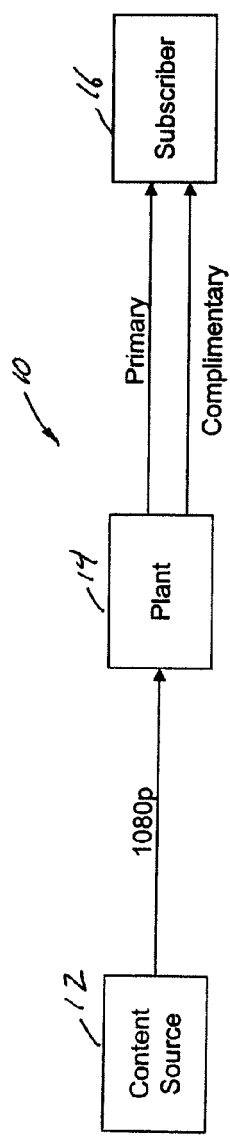
Fig. 1
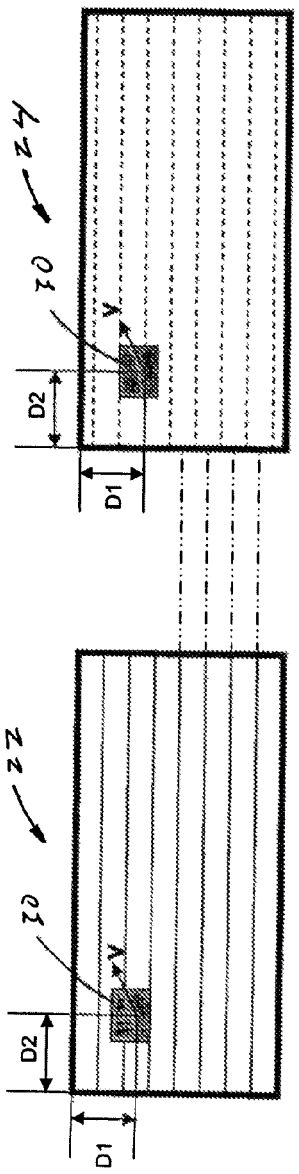
Fig. 3
Fig. 4
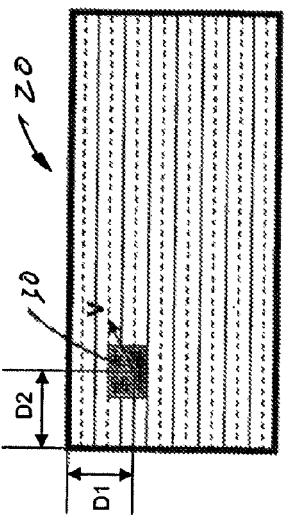
Fig. 5

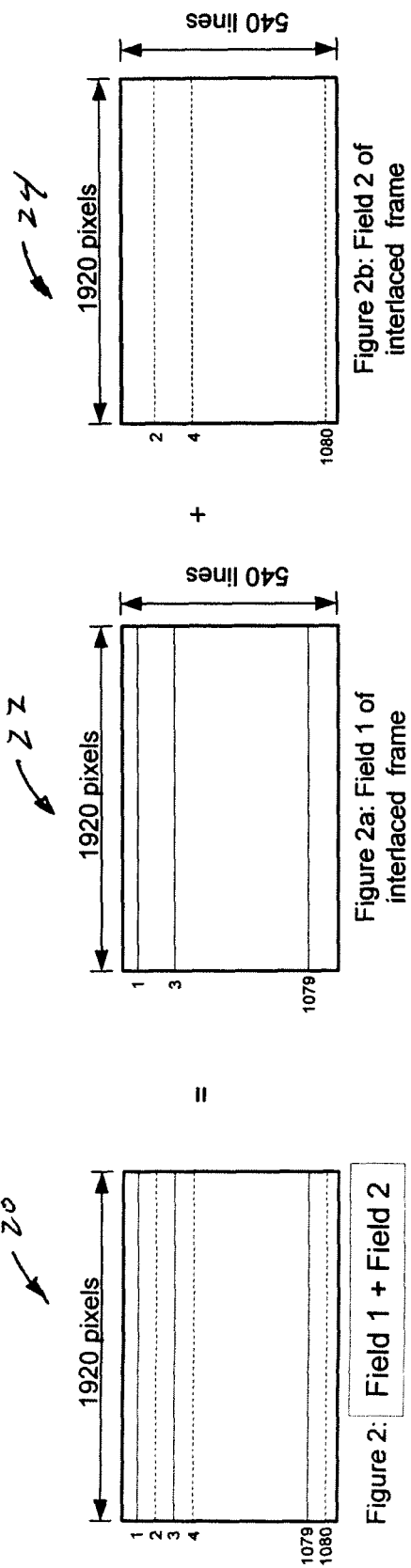

METHOD OF CODING AND TRANSMISSION OF PROGRESSIVE VIDEO USING DIFFERENTIAL SIGNAL OVERLAY

BACKGROUND OF THE INVENTION

1. Field of the Invention

The present invention relates to using a differential signal overlay on an existing transmitted video signal for coding and transmission of a progressive video signal to a display.

2. Background Art

Moving images can be shown on televisions and other displays by successively displaying a number of still pictures. The rapid succession of images allows slight changes in movement of the pictures to be captured and shown in a smooth manner. The picture motion appears smoother if each of the pictures, commonly referred to as frames, are successively displayed at a rate faster than human perception, i.e., the movement appears smoother if the frames are displayed at a regular rate of at least 1/30th of a second apart or 30 frames per second.

The resolution at which the frames are displayed can vary depending on the capabilities of the display system and the encoding of the pictures. One resolution measurement is based on the number of vertical and horizontal lines of pixels that the display can support. One increasingly popular display resolution is 1080p which is used in High Definition (HD) signals and HD sets that are capable of handling this display format. As HD industry increasingly penetrates the television market, 1080p will become a common display format. Displays having capabilities to support 1080p are capable of displaying a picture of 1,920 horizontal pixels/line by 1,080 vertical pixel lines (full frame, total of 2,073,600 pixels) every 1/60th of a second. The 1080p level of resolution is considered to be progressive since a full frame is displayed every 1/60th of a second, i.e., such that all pixels of frame are display at one instance in time.

Another common signal and display resolution is 1080i (1920×1080 pixels at 30 frames per second). Signals and displays having capabilities to support 1080i resolution are capable of displaying every other vertical line of a picture such that the picture includes 1,920 horizontal pixels/line by 540 vertical pixel lines (half frame, total of 1,036,800 pixels) every 1/60th of a second. The other half of the picture is shown immediately after the first part of the picture, at the same rate and resolution, such that a perceived full frame is displayed every 1/30th of a second. The 1080i level of resolution is considered to be interlaced since alternating half frames (fields) are displayed every 1/60th of a second.

To facilitate transmitting the pictures, the pictures may be individually encoded and compressed. Any number of methodologies and standards are available for the video compression. Moving Picture Experts Group (MPEG) is one commonly used compression standard. Like many compression standards, MPEG breaks each frame into a number of blocks (macroblocks) or other units to facilitate transmitting the signal. The blocks may be separately compressed or omitted from transmission depending on the pictures included and the associated compression/transmission technique. The blocks are then reassembled for display in a process that predicts the location of a block for a current frame based on the location of a block in a reference or preceding frame.

Motion vectors may be associated with each block to facilitate predicting movement, and ultimately reconstructing the blocks. Motion vectors may be essential in many compression methodologies to provide a temporal component to compression. Motion vectors can be used to facilitate predicting the frame-to-frame location of macroblocks. This can be done temporally by aligning presentation timecode and then spatially by alignment of macroblocks at corresponding indexes or corresponding locations.

BRIEF DESCRIPTION OF THE DRAWINGS

The present invention is pointed out with particularity in the appended claims. However, other features of the present invention will become more apparent and the present invention will be best understood by referring to the following detailed description in conjunction with the accompany drawings in which:

FIG. 1 illustrates a system for simulating a signal in accordance with one non-limiting aspect of the present invention;

FIGS. 2a-c illustrate a combination of a primary and complementary signals to simulate the signal in accordance with one non-limiting aspect of the present invention; and FIGS. 3-5 illustrates a use of blocks to facilitate combining the primary and complementary signals in accordance with one non-limiting aspects of the present invention.

DETAILED DESCRIPTION OF THE PREFERRED EMBODIMENT(S)

FIG. 1 illustrates a system 10 for simulating a 1080p (1920×1080p at 60 frames per second) signal in accordance with one non-limiting aspect of the present invention. The system 10 includes features configured to facilitate simulating quality associated with a 1080p signal, optionally without consuming the carriage bandwidth of a typical 1080p signal. For exemplary purposes and without intending to limit the scope and contemplation of the present invention, the present invention is predominately described with respect to simulating a 1080p signal. The present invention, however, fully contemplates its application to video of any resolution or picture quality that employs prediction mechanisms, and not just 1080p.

The system 10 may include a content source 12 for sourcing electronic content. The content may relate to movies, television, video, music, data, etc. The content source 12, for example, may be a network broadcast entity, such as NBC, ESPN, etc., or a motion picture entity or studio, such as Universal Studio, MGM, etc. The content may be transmitted from the content source 12 to a plant 14 for distribution to one or more subscribers 16. The plant 14 may be a cable or satellite television provider or other entity associated with delivering the received the content to the subscribers 16.

The content may be transmitted through wireline or wireless transmission and/or hard-copy transmission, such as discs (DVD, etc.), flash memory, or other non-bandwidth consumptive devices that reduce storage requirements. The content transmitted from the content source 12 may be received by the plant 14 in a form associated with relative high output quality/resolution, such as but not limited to that associated with a 1080p signal. The high quality signal may require a corresponding high amount of bandwidth if it is simply transmitted to the subscribers 16 without further processing. The plant 14 may include capabilities to provide further processing of the signals so that the content can be transmitted to the subscribers 16 in a manner that will consume less bandwidth than the original content and/or provide better quality/resolution with features already in use by the plant 14.

The plant 14 may transmit the content with lower bandwidth consumption by replacing the 1080p signal with a primary and complimentary set of signals. The primary and complimentary signals may be transmitted to the subscriber 16 for simultaneous display. An output device (not shown) associated with the subscriber 16 may be required to include capabilities for keying one signal with another to facilitate simultaneously displaying both signals. This keying can be done spatial based on motion vectors and temporally based on presentation time codes. The simultaneously displayed signals may be used to simulate the quality associated with the original 1080p signal in accordance with one non-limiting aspect of the present invention.

The primary and complementary signals may be any set of signals that can be used to simulate the 1080p signal. For example, the signals may respectively be first and second 1080i signals that can be displayed to simulate the 1080p signal. The 1080i signals may be interlaced signals configured to provide pictures for every other one of the 1,080 horizontal pixel lines of the output device (half frame or field). The alternate half frame may be displayed every 1/60th of a second to create a perceived full frame picture at every 1/30th of a second. The second or complementary 1080i signal may be offset or keyed relative to the first 1080i signal so that the second 1080i signal covers every other line not covered by the first 1080i signal when both signals are simultaneously displayed. This allows the display device to output a full frame picture every 1/30th of a second since the combination of the two half frames at 1/60th of a second provides a full frame picture.

Optionally, the present invention is able to transmit the second 1080i signal at a lower bandwidth than the first 1080i signal by transmitting it without motion vectors. The pictures associated with the second 1080i signal can be spatially keyed with the motion vectors of the first 1080i signal to facilitate displaying both signals, thus creating the 1080p60 video. This can occur because a strong spatial correlation exists between the two half frames since they are sampled at the same instant in time. In the case where there is significant error, a few motion vectors can be carried in the second 1080i stream to facilitate reducing the errors. This allows the plant to simulate the 1080p signal with less bandwidth consumption than a standard 1080p signal.

The primary signal may be characterized as the signal having motion vectors and the complementary signal may be characterized as the signal that relies wholly or partly on the motion vectors in the primary signal. The present invention describes the primary and complementary signals being 1080i signals for simulating 1080p and for exemplary purposes. The primary and complementary signals may be any type of signal depending on the desired simulation, and optionally, one of the signals may rely on motion vectors or other elements of the other signal to facilitate its display and to facilitate conserving bandwidth. The present invention also contemplates to use of more than one complementary signal. This may occur as increased spatial (picture size) or temporal resolutions (frame rate) are demanded to accommodate multiple display capabilities while minimizing the amount of corresponding transmitted bandwidth needed at the television plant.

FIGS. 2a-c illustrate a combination of the primary and complementary signals used to simulate the 1080p signal in accordance with one non-limiting aspect of the present invention. FIG. 2a illustrates a display 20 having the simulated 1080p signal picture. FIG. 2b illustrates a display 22 having the primary signal picture (field 1 of the interlace frame) and FIG. 2c illustrates a display 24 having the complementary signal picture (field 2 of the interlaced signal). The primary and complementary signals are combined, as indicated with the addition sign, to provide the simulated 1080p signal shown in FIG. 2a.

The half frames provide a picture having 1,920 horizontal pixel lines by 540 vertical pixel lines (total of 1,036,800 pixels) every 1/60th of a second. The half frames fill the entire picture when simultaneously displayed (FIG. 2a) such that the pictures simulates 1080p, i.e., a picture that includes 1,920 horizontal pixels/line by 1,080 vertical pixel lines (full frame, total of 2,073,600 pixels) every 1/60th of a second. In some cases, the plant 14 (television provider) may already include the capabilities to broadcast the primary 1080i signal such that it would only then need to add the capabilities to broadcast and display the complimentary 1080i signal in order to simulate the 1080p signal. This can allow the provider to enhance the spatial resolution of the existing 1080i signal so as to simulate the 1080p signal without having to actually broadcast the 1080p signal. The broadcast of a normal 1080p signal, coded separately and delivered in different channel for the 1080p receivers, would require extra bandwidth.

FIG. 3 illustrates a block 30 (macroblock) used to facilitate compressing and transmitting the pictures associated with the 1080i signals. Each frame may be broken into two fields which can include a number of blocks 30 to facilitate reconstructing the signals. The blocks 30 may be separately compressed or omitted from transmission depending on the pictures and the associated compression/transmission technique. The blocks can then be reassembled for display in a process that predicts the location of a block within a current frame based on the location of the block in a reference or preceding field. A motion vector V may be associated with each block to facilitate predicting movement, and ultimately reconstructing the block in a future picture.

FIG. 4 illustrates the 1080i complementary signal being displayed in a manner similar to the 1080i signal shown in FIG. 3. The complementary signal may be keyed relative the motion vectors associated with the blocks 30 of the primary signal such that they occupy a different set of every other horizontal pixel lines within the display based on the lines being occupied by the primary signal. References lines are run between FIG. 3 and FIG. 4 to illustrate the picture lines of the complimentary signal occupying every other line of the display area relative to the primary signal. When the two signals are simultaneously displayed, their corresponding picture lines fill all 1080 horizontal pixel lines of the output devices, as shown in FIG. 5, to simulate a 1080p signal.

The complementary signal stream may rely on the motion vectors included within the 1080i signal since a strong spatial correlation exists within that frame due to it being the same instance in time. The motion vectors of the blocks in the complementary stream are strongly similar to the near same locations of the blocks in the primary signal. Reuse of the motion vectors from the primary signal for those near same location blocks in the complementary stream can be done with minimal, if any, degradation to the displayed picture. Traditional motion vector can account for up to 40% of a compressed stream bandwidth. This allows the present invention to transmit the signals with lower bandwidth consumption than if both signals included their own motion vectors.

As supported above, one non-limiting aspect of the present invention relates to providing a complementary video encoded stream to an existing video stream in order to increase the picture resolution created by a combination of the two streams. In this approach, the complementary stream may use the motion vectors of the primary stream to indicate block movement with minimal spatial error encoded pictures generated based on these motion vectors. One non-limiting aspect of the invention relates to simulcasting a 1080p60 picture signal with an already existing 1080p30 picture signal present on the system. If a provider is using a 1080i30 stream and wishes to also provide a 1080p60 stream for the same content, the provider can save bandwidth by transmitting the low bit rate complementary stream (spatially predicted without its own motion vectors) instead of an entirely separate 1080p stream or a higher bit rate difference stream (with motion vectors). This can also be used for any picture size transmitting in interlaced and progressive formats. The present invention takes advantage of the close spatial correlation in the same time instance between the interlaced and progressive mode of pictures and uses this to save bandwidth (via not sending additional motion vectors in a complementary difference stream) for situations where the interlaced and progressive versions of the content is simulcast on the provider's system.

A 1080i stream at 30 Hz (1080i30) displays a half resolution picture (1920×540 which is a 'field') every 1/60th of a second. A second field picture is thereafter displayed 1/60th of a second to perceptually create a full resolution (1920×1080 which is a frame) picture to the observer of the video monitor at a perceptual 1/30th of a second. In a 1080P at 60 Hz stream, a 1920×1080 picture is displayed at 1/60th of a second. The interlaced fields are time sampled at the same time as the progressive frames. The difference is that an interlaced field has the half of the lines of a progressive frame (by sampling every other lines). In accordance with one non-limiting aspect of the present invention, a 1080 progressive frame can be broken into two interlaced field pictures (complimentary) displaced by a spatial distance of two consecutive lines of a progressive frame sampled at the same instant of time. In a similar way, a 1080p 60 frames per second sequence can be broken into 2 complimentary 1080i sequences. First 1080i picture consists of lines (L1 L3 L5 . . . L1079) and the second 1080i picture with lines (L2 L4 L6 . . . L1080).

The present invention contemplates a first sequence of 1080i pictures will be coded as a standard 1080i sequence and second sequence of 1080i pictures can be coded as differential (residual) with respect to the pictures of the first sequence, without motion vectors. A receiver can reconstruct back the 1080p 60 fps out of the two complementary 1080i sequences. In the second sequence, the motion vectors of the first sequence can be used. The correlation between the two sequences can happen because each field of the two respective sequences corresponds to the same instant in time but represents complementary lines. The close correlation of the motion vectors in the same instant fields allows for only one set of motion vectors to be used for both streams. The resulting residual difference pictures in the second sequence can be adjusted with minimal complexity to these motion vectors. The resulting savings in not carrying the second set of motion vectors can save around 30% with some encoder complexity savings as well.

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of simulating a 1080p signal, the method comprising:
    transmitting a first 1080i signal with motion vectors;
    transmitting a second 1080i signal with less motion vectors than the first 1080i signal; and
    enabling simultaneous decode of the first and second 1080i signals, the simultaneous decode of the first and second 1080i signals forming the 1080p signal.

2. The method of claim 1 further comprising keying the second 1080i signal with the motion vectors of the first 1080i signal to facilitate simultaneously decoding the first and second 1080i signals.

3. The method of claim 1 further comprising transmitting the second 1080i signal without motion vectors.

4. The method of claim 1 further comprising transmitting the first and second 1080i signals at 60 fields per second such that the simultaneously decoded first and second 1080i signals results in display of the 1080p signal at 60 frames per second when the first and second 1080i signals are simultaneously displayed.

5. The method of claim 1 further comprising, prior to transmitting the first and second 1080i signals, generating the first and second 1080i signals by sampling an original 1080p signal such that each frame of the first and second 1080i signals are sampled at the same instant of time from the original 1080p signal.

6. The method of claim 1 further comprising forming the 1080p signal by simultaneously displaying the first and second 1080i signals.

7. The method of claim 1 wherein the first 1080i signal comprising odd fields and the second 1080i signal comprises even fields.

8. A method of simulating a progressive signal with non-progressive signals, the method comprising:
    transmitting a first interlaced signal with motion vectors;
    transmitting a second interlaced signal with less motion vectors than the first signal; and
    enabling simultaneous decoding of the first and second signals, the simultaneous decoding of the first and second signals providing the progressive signal.

9. The method of claim 8 further comprising keying the second signal with the motion vectors of the first signal to facilitate simultaneously decoding of the first and second signals.

10. The method of claim 8 further comprising transmitting the second signal without motion vectors.

11. The method of claim 8 further comprising transmitting the first and second signals at 60 fields per second such that the simultaneously decoded signals provide the 1080p signal at 60 frames per second.

12. The method of claim 8 further comprising sampling an original progressive signal to generate the transmitted first interlace signal and the second interlaced signal.

13. The method of claim 12 further comprising each of the first and second interlaced signals comprising a plurality of frames, and wherein the method further comprises sampling the original progressive signal such that each frame of the first and second interlaced signals are sampled at the same instant of time from the original progressive signal.

14. A method of displaying a picture, the method comprising:
receiving a first signal representing the picture with a first spatial resolution, the first signal being sampled from the picture;
receiving a second signal representing the picture with a second spatial resolution, the second signal being sampled from the picture at the same instance in time as the first signal, the first and second spatial resolutions being approximately equal;
combining the received second signal with the received first signal in order to display the picture with a third spatial resolution, the third spatial resolution being approximately equal to a sum of the first and second spatial resolutions; and
keying the second signal according to motion vectors associated with the first signal.

15. The method of claim 14 further comprising using the second signal to increase the spatial resolution between rows of pixels associated with the first signal.

16. The method of claim 14 further comprising keying the second signal without relying on the second signal to include motion vectors.

17. The method of claim 16 further comprising providing the second signal without motion vectors.

18. The method of claim 16 further comprising keying the second signal spatially according to the motion vectors included within the first signal.

19. The method of claim 16 further comprising keying the second signal temporally according to time codes includes within both of the first and second signals.

20. The method of claim 14 further comprising the signals being provided to simulate the picture in 1080p format.

21. The method of claim 20 further comprising the signals being television signals such that the picture is a television picture.

22. The method of claim 21 further comprising the first and second signals being 1080i signals.

23. The method of claim 22 further comprising receiving the first and second 1080i signals at 60 frames per second such that the combined first and second 1080i signals provide the 1080p signal at 60 frames per second.

24. A method of displaying a picture, the method comprising:
receiving a first signal representing the picture with a first spatial resolution, the first signal being sampled from the picture;
receiving a second signal representing the picture with a second spatial resolution, the second signal being sampled from the picture at the same instance in time as the first signal, the first and second spatial resolutions being approximately equal;
combining the received second signal with the received first signal in order to display the picture with a third spatial resolution, the third spatial resolution being approximately equal to a sum of the first and second spatial resolutions; and
the second signal being provided with less motion vectors than the first signal.

* * * * *